(12) United States Patent
Sundaresan et al.

(10) Patent No.: US 10,686,865 B2
(45) Date of Patent: Jun. 16, 2020

(54) THIRD-PARTY APPLICATION CONTROL OF DEVICES IN AN IOT PLATFORM

(71) Applicant: Ayla Networks, Inc., Santa Clara, CA (US)

(72) Inventors: Sudha Sundaresan, Saratoga, CA (US); Vadym Byelov, Mountain View, CA (US); Anirudha Deglurkar, San Jose, CA (US)

(73) Assignee: Ayla Networks, Inc., Santa Clara, CA (US)

( * ) Notice: Subject to any disclaimer, the term of this patent is extended or adjusted under 35 U.S.C. 154(b) by 263 days.

(21) Appl. No.: 15/914,960

(22) Filed: Mar. 7, 2018

(65) Prior Publication Data

US 2018/0295176 A1    Oct. 11, 2018

Related U.S. Application Data

(60) Provisional application No. 62/483,791, filed on Apr. 10, 2017.

(51) Int. Cl.
*H04L 29/08*    (2006.01)
*H04L 29/06*    (2006.01)
(Continued)

(52) U.S. Cl.
CPC .............. *H04L 67/04* (2013.01); *G06F 3/167* (2013.01); *H04L 63/10* (2013.01); *H04L 67/141* (2013.01);
(Continued)

(58) Field of Classification Search
None
See application file for complete search history.

(56) References Cited

U.S. PATENT DOCUMENTS 10,284,705 B2 * 5/2019 Zheng ................... G06F 3/0482
10,291,624 B1 * 5/2019 Cronin .................. H04L 63/061
(Continued)

OTHER PUBLICATIONS

Chmielewski, Jacek et al. "Application architectures for smart multi-device applications". Multi-Device '12: Proceedings of the Workshop on Multi-device App Middleware. Dec. 2012. Article No. 5. pp. 1-5 (Year: 2012).*

(Continued)

*Primary Examiner* — Jeffrey R Swearingen
(74) *Attorney, Agent, or Firm* — Lowenstein Sandler LLP

(57) ABSTRACT

In embodiments a computing device receives a selection of a device template associated with a physical device. The computing device receives a selection of a third-party device type associated with a third-party system. The computing device determines a device rule template associated with the device type, the device rule template comprising a first mapping between one or more commands and one or more additional device properties in the device type. The computing device determines a second mapping between the one or more additional device properties and one or more device properties in the device template. The computing device generates an adapter template comprising the first mapping between the one or more commands and the one or more additional device properties and the second mapping between the one or more additional device properties and the one or more device properties.

20 Claims, 11 Drawing Sheets

(51) Int. Cl.
  *G06F 3/16* (2006.01)
  *H04W 12/08* (2009.01)
  *G06F 9/54* (2006.01)

(52) U.S. Cl.
  CPC ............ *H04L 67/20* (2013.01); *H04W 12/08* (2013.01); *G06F 9/54* (2013.01)

(56) References Cited

U.S. PATENT DOCUMENTS

| | | | |
|---|---|---|---|
| 2016/0226732 A1* | 8/2016 | Kim | H04L 12/2807 |
| 2017/0041316 A1* | 2/2017 | Setchell | H04L 63/0876 |
| 2017/0105190 A1* | 4/2017 | Logan | H04W 68/00 |
| 2018/0115611 A1* | 4/2018 | Lear | H04L 67/125 |

OTHER PUBLICATIONS

Sales, Thiago et al. "Enabling user authentication and authorization to support context-aware UPnP applications." WebMedia '09: Proceedings of the XV Brazilian Symposium on Multimedia and the Web. Oct. 2009, Article No. 3. pp. 1-8 (Year: 2009).*

Blackstock, Michael et al. "WoTKit: a lightweight toolkit for the web of things." WOT '12: Proceedings of the Third International Workshop on the Web of Things. Jun. 2012. Article No. 3. pp. 1-6 (Year: 2012).*

* cited by examiner

```
THIRD-PARTY DEVICE TYPE 402
{
    "name": "variable rotation speed fan",
    "description": "Alexa device type: variable rotation speed fan",
    "property_types": [
        {
            "skill": "turnOn,turnOff",
            "base_type": "integer",
            "xdomain": "0,1",
            "yrange": "0,1"
        },
        {
            "skill": "setPercentage,incrementPercentage,decrementPercentage",
            "base_type": "integer",
            "xdomain": "0,25,50,75,100",
            "yrange": "0,1,2,3,4"
        }
    ]
}
```

FIGURE 4A

```
DEVICE TEMPLATE 401
{
    "template": {
        "oem": "acme",
        "model": "ledevb",
        "name": "abc_template_01",
        "description": "Acme variable rotation speed fan",
        "id": 8103,
        "product_name": "ceiling fan"
    }
}
```

FIGURE 4B

```
{
    DEVICE RULE TEMPLATE 403
    "device_type": "variable rotation speed fan",
    "is_concrete": 0,
    "description": "variable fan abstract template",
    "oem": "abstract",
    "oem_model": "abstract",
    "template_version": "abstract",
    "intent_rules": [
        {
            "description": "fan turnOn rule",
            "intent": "turnOn",
            "property_rules": [
                {
                    "property_index": 1,
                    "skill": "turnOn,turnOff",
                    "base_type": "integer",
                    "xdomain": "[0],[1]",
                    "yrange": "[0],[1]",
                    "opcondition": "[0]",
                    "update_rule": "[1]",
                    "pre_update_rule": "[]",
                    "post_update_rule": "[]"
                },
                {
                    "property_index": 2,
```

FIGURE 4C

```
ADAPTER TEMPLATE 404

{
    "device_type": "variable rotation speed fan",
    "is_concrete": 1,
    "description": "Acme variable rotation speed fan",
    "oem": "acme",
    "oem_model": "ledevb",
    "template_version": "abc_template_01"
    "intent_rules": [
        {
            "description": "fan turnOn rule",
            "intent": "turnOn",
            "property_rules": [
                {
                    "property_index": 1,
                    "skill": "turnOn,turnOff",
                    "base_type": "integer",
                    "xdomain": "[1],[2]",
                    "yrange": "[0],[1]",
                    "opcondition": "[0]",
                    "update_rule": "[1]",
                    "pre_update_rule": "[]",
                    "post_update_rule": "[]"
                },
                {
                    "property_index": 2,
```

FIGURE 4D

THIRD-PARTY APPLICATION CONTROL OF DEVICES IN AN IOT PLATFORM

RELATED APPLICATIONS

This patent application claims the benefit under 35 U.S.C. § 119(e) of U.S. Provisional Application No. 62/483,791, filed Apr. 10, 2017, which is herein incorporated by reference.

BACKGROUND

Many modern appliances, consumer devices, and other devices include embedded systems that are configured to perform one or more dedicated functions. However, most embedded systems of such devices do not include networking capabilities, role based access control capabilities, remote interface capabilities, remote control capabilities, or related capabilities. Designing such functionality into an embedded system, designing application programming interfaces (APIs) for accessing such functionality, designing web services capable of communicating with and controlling the embedded system via this added functionality, and designing applications for taking advantage of this functionality can consume considerable resources of the device manufacturer.

As the support of devices with embedded systems has gained adoption, the fragmentation of services provided by networking providers for these devices has dramatically increased. For example "vertical" providers may limit their support to a single device type. Similarly, "horizontal" providers may support multiple devices but require proprietary interface protocols. A device manufacturer that would like to provide networking access to their device using more than a single networking platform may be faced with having to support multiple applications and/or systems, each with its own interface requirements. This can place a heavy burden on a manufacturer to expend significant resources in order to support connectivity via a variety of networking platforms and third-party services.

BRIEF DESCRIPTION OF THE DRAWINGS

Reference will now be made to the accompanying drawings showing example embodiments of the present application, and in which:

FIG. 4A illustrates an example third party device type, in accordance with embodiments of the present disclosure;

FIG. 4B illustrates an example device template, in accordance with embodiments of the present disclosure;

FIG. 4C illustrates an example device rule template, in accordance with embodiments of the present disclosure;

FIG. 4D illustrates an example adapter template, in accordance with embodiments of the present disclosure;

DETAILED DESCRIPTION

Figure 1:
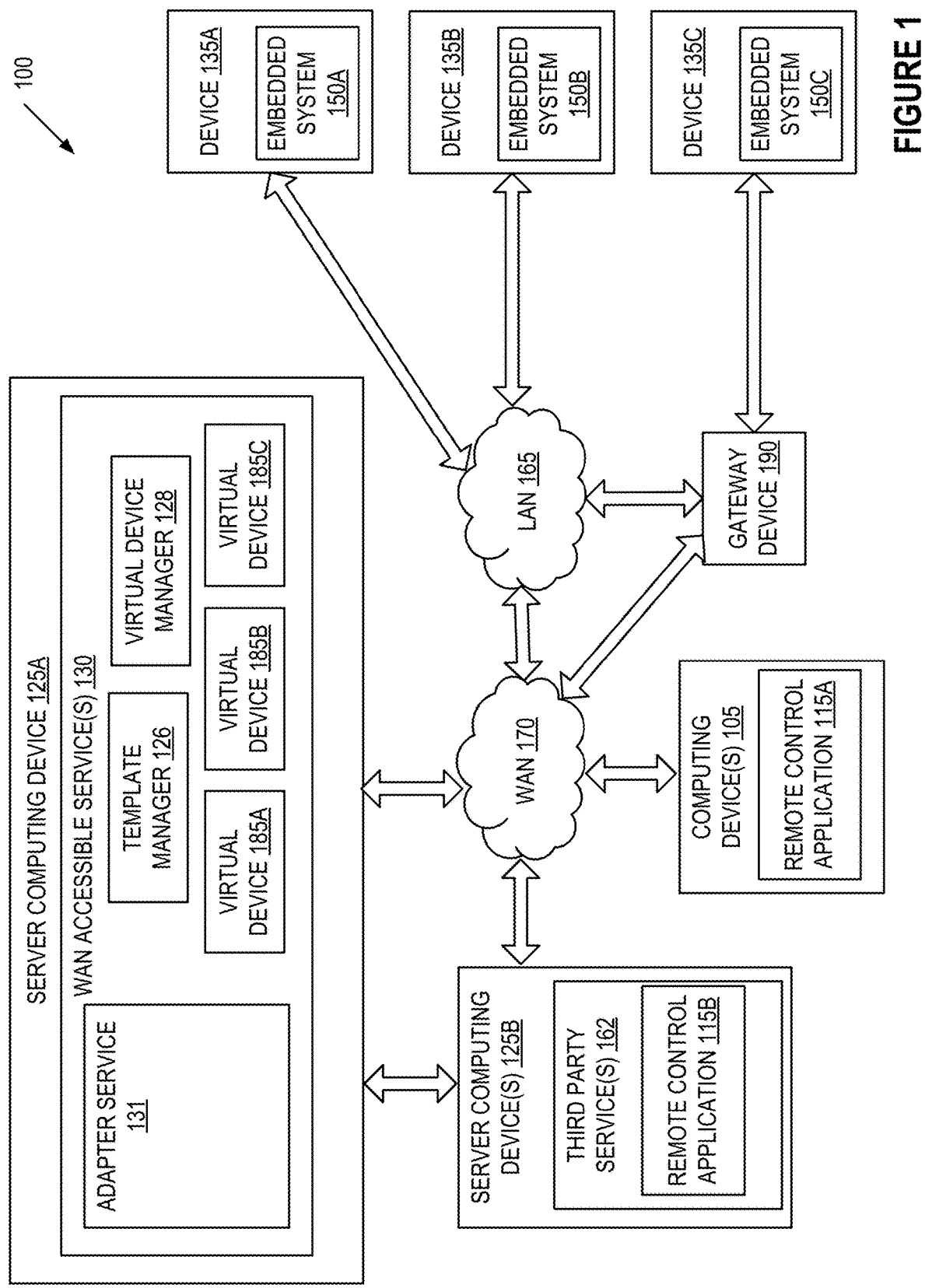
FIG. 1 is a block diagram depicting an example network architecture including remotely accessible devices and virtual devices for the remotely accessible devices, in accordance with embodiments of the present disclosure.

Embodiments are directed to a network-connected device platform (also referred to as an internet-of-things (IoT) cloud platform or simply an IoT platform) having an agile templating framework that provides a flexible and unified interface to multiple third-party services across multiple connected physical devices. A connected device has many properties that can be controlled by a user and many properties (also referred to as attributes) that are used for monitoring and data collection purposes. The set of properties for a device varies based on the type of device, the model and the firmware it runs. These properties constitute the physical model of the device that is hardware and firmware dependent. In addition, the device has various behavioral characteristics that the original equipment manufacturer (OEM) can define that are independent of hardware or firmware considerations. Some examples of these characteristics are alerts that are to be sent when certain device events happen, roles that have access to the device, and the method to be used for registering the device to a user account. These behaviors may be controlled by a cloud server and can vary at any point during the lifecycle of a device.

An OEM may wish to provide users with the ability to control their connected devices using a variety of different third-party services and/or networking platforms rather than restrict them to a single method of control. In conventional implementations, users are often expected to use multiple applications or third-party cloud services to control different connected devices that they own. For example, a user may own a variable speed fan and a thermostat that are both network enabled, but each requiring different applications or third-party services to control remotely. Similarly, the user's fan may work with one voice activated intelligent assistant, but the thermostat may only work with a different assistant that the user does not have. The number of third-party services and applications that are now available to consumers places the burden on OEM's to devote significant resources to accommodate the interfaces for multiple third-party services in order to provide the most robust product for their customers.

Aspects of the present disclosure address the problems that arise when providing control access for connected devices through multiple third-party services as well as the problems that arise when providing control access to multiple different connected devices through a single third-party service. By adopting a flexible templating framework that can translate properties and behaviors between the OEM's view of the device and the third-party service's view of the device, the platform described herein can provide end users with the ability to interact with all of their connected devices through a single interface, regardless of the manufacturer of the device. Additionally, the platform can provide an OEM with a flexible framework for providing access to their products through any third-party application or service without placing a burden upon the OEM to devote development resources to facilitate the communication.

In one embodiment, a device template manager receives a device template for an OEM device that describes the properties (attributes) of the device as well as actions that may be performed on the device. The device template manager may then identify a compatible third-party device type that describes property values and behaviors for that device that are supported by the third-party service. The device template manager may then identify a device rule template that specifies the device state transition rules for the device that are supported by the third-party service, and subsequently generate an "adapter template" that creates an association between the OEM's property values and behaviors for the device and the third-party service's corresponding property values and behaviors.

In one embodiment, a processing device receives a selection of a device template associated with a physical device, wherein the device template comprises one or more device properties of the physical device. The processing device further receives a selection of a third-party device type associated with a third-party system, wherein the third-party device type comprises one or more additional device properties of the third-party system that correspond to the one or more device properties of the physical device. The processing device determines a device rule template associated with the device type, the device rule template comprising a first mapping between one or more commands and the one or more additional device properties. The processing device further determines a second mapping between the one or more additional device properties and the one or more device properties. The processing device then generates an adapter template that comprises the second mapping between the one or more additional device properties and the one or more device properties. The adapter template may further comprise the one or more device properties, the one or more additional device properties, and/or the first mapping between the one or more commands and the one or more additional device properties.

An adapter service component of the framework may use the adapter template to facilitate communication between the third-party service and the OEM device. An end user may submit a command to control the device to the third-party service using the commands and/or settings supported by the third-party service. The third-party service may then send that information to the adapter service, which may then translate the information from the third-party into a form recognized by the OEM device using an adapter template generated for that device and perform the appropriate actions to control the device based on the user's commands.

Referring now to the figures, FIG. 1 is a block diagram depicting an example network architecture 100 including remotely accessible devices 135A-C and computing devices 105, 125A, 125B that interact with the remotely accessible devices 135A-C. The network architecture 100 includes the multiple devices 135A-C connected to a local area network (LAN) 165. Thus, the devices 135A-C may be referred to as network-connected devices.

In one embodiment, the devices 135A-C are devices with embedded systems 150A-C, and may include, for example, electrical appliances such as variable rotation speed fans, refrigerators, ovens, washers, driers, dishwashers, thermostats, alarms, air conditioners, televisions, radios, receivers, amplifiers, and so forth. The devices 135A-C may also include consumer devices such as digital watches, music players, game consoles, digital cameras, printers, and so forth. Other examples of devices 135A-C include stationary devices such as HVAC systems, traffic lights, factory controllers, signs, electronic billboards, sprinkler systems, and irrigation control systems, as well as medical devices. The embedded systems 150A-C may also be referred to as network-connected devices. Devices 135A-C may also be any other type of device that includes an embedded system. Alternatively, one or more devices 135A-C may not include an embedded system.

An embedded system 150A-C is a class of computing device that is embedded into another device as one component of the device. The device 135A-C typically also includes other hardware, electrical and/or mechanical components that may interface with the embedded system 150A-C. Embedded systems 150A-C are typically configured to handle a particular task or set of tasks, for which the embedded systems 150A-C may be optimized. Accordingly, the embedded systems 150A-C may have a minimal cost and size as compared to general computing devices.

The embedded systems 150A-C may each include a communication module (not shown) that enables the embedded system 150A-C (and thus the device 135A-C) to connect to LAN 165 or to a wireless carrier network (e.g., that is implemented using various data processing equipment, communication towers, etc.). The communication module may be configured to manage security, manage sessions, manage access control, manage communications with external devices, and so forth.

In one embodiment, the communication module is configured to communicate using Wi-Fi®. Alternatively, the communication module may be configured to communicate using Bluetooth®, Zigbee®, Internet Protocol version 6 over Low power Wireless Area Networks (6LowPAN), power line communication (PLC), Ethernet (e.g., 10 Megabyte (Mb), 100 Mb and/or 1 Gigabyte (Gb) Ethernet) or other communication protocols. If the communication module is configured to communicate with a wireless carrier network, then the communication module may communicate using Global Systems for Mobile Communications (GSM), Code-Division Multiple Access (CDMA), Universal Mobile Telecommunications Systems (UMTS), 3GPP Long Term Evaluation (LTE), Worldwide Interoperability for Microwave Access (WiMAX), or any other second generation wireless telephone technology (2G), third generation wireless telephone technology (3G), fourth generation wireless telephone technology (4G) or other wireless telephone technology.

The LAN 165 includes a router, switch, bridge or other network device (not shown) that enables communication between multiple devices connected to the LAN 165. The network device may provide wired connections to the LAN using, for example, Ethernet ports, universal serial bus (USB) ports and/or Firewire® ports. The network device may additionally provide wireless connections to the LAN using, for example, a Wi-Fi transceiver.

Some embedded systems 150A-C may not support any of the communication types supported by the network device. For example, device 135C may support Zigbee, and device 135B may support Bluetooth. To enable such devices to connect to the LAN 165, the LAN 165 may include a gateway device 190 connected to the network device via one of the connection types supported by the network device (e.g., via Ethernet or Wi-Fi). The gateway device 190 may additionally support other communication protocols such as Zigbee, PLC and/or Bluetooth, and may translate between supported communication protocols. Accordingly, some devices (e.g., device 135C) may connect to the LAN 165 and/or to the WAN 170 through the gateway device 190.

The LAN 165 (or wireless carrier) is connected to a wide area network (WAN) 170. The WAN 170 may be a private WAN (e.g., an intranet) or a public WAN such as the Internet, or may include a combination of a private and public network. The LAN 165 may include a router and/or modem (e.g., a cable modem, a direct serial link (DSL) modem, a Worldwide Interoperability for Microwave Access (WiMAX®) modem, a long term evolution (LTE®) modem, etc.) that provides a connection to the WAN 170.

The WAN 170 may include or connect to one or more server computing devices 125A-B. The server computing devices 125A-B may include physical machines and/or virtual machines hosted by physical machines. The physical machines may be rackmount servers, desktop computers, or other computing devices. In one embodiment, the server computing devices 125A-B include virtual machines managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

Server computing device 125A hosts one or more WAN accessible services 130, which may be a web based service and/or a cloud service (e.g., a web based service hosted in a cloud computing platform). A WAN accessible service 130 may maintain a session (e.g., via a continuous or intermittent connection) with one or more of the embedded systems 150A-C. Alternatively, the WAN accessible service 130 may periodically establish sessions with the embedded systems 150A-C. Sessions and connections may be between a virtual device 185A-C running on the server computing device 130 and the devices 135A-C.

Via a session with an embedded system 150A-C (or device 135A-C), WAN accessible service 130 may use an appropriate virtual device 185A-C to issue commands to the embedded system (or device 135A-C) and/or receive status updates from the embedded system (or device 135A-C). Thus, the virtual device 185A-C may be used to control the device 135A-C. The commands may be commands to change a state of one or more parameters of a device controllable by the embedded system. For example, if the embedded system is embedded in a heater or thermostat, then the commands may include commands to increase or decrease a temperature. In another example, if the embedded system is embedded in a home automation system, then the commands may include commands to turn lights on or off. In another example, if the embedded system is embedded in a variable rotation speed fan, then the commands may include commands to increase or decrease the fan speed.

Status updates received from the embedded systems 150A-C may identify values or states of some or all detectable parameters of devices 135A-C that the embedded systems are included in. Status updates may also include fault information, statistical device usage information, trace data and/or other information. Such values, states and/or other information may change based on direct user interaction with the devices. Such values, states and/or other information may also change responsive to commands sent to the embedded systems 150A-C by the WAN accessible service 130 and/or by computing devices 105 via an appropriate virtual device 185A-C. Moreover, values, states and other information of the embedded systems 150A-C may change based on environmental conditions of the embedded systems. By maintaining or periodically establishing sessions with the embedded systems 150A-C, the WAN accessible services 130 may maintain up-to-date information on the devices 135A-C, and such up-to-date information may be reflected in a virtual device 185A-C.

Computing devices 105 may generate commands for the embedded systems 150A-C. Computing devices 105 may include portable devices such as electronic book readers, portable digital assistants, mobile phones, laptop computers, portable media players, tablet computers, cameras, video cameras, netbooks, notebooks, and the like. Computing devices 105 may also include traditionally stationary devices such as desktop computers, gaming consoles, digital video disc (DVD) players, media centers, and the like. Computing devices 105 may also include devices capable of receiving voice commands such as intelligent assistant devices that may interface with home networks. In some implementations, computing devices 105 may include smart home assistant devices such as Amazon Echo®, Google Home®, Apple HomePod®, or the like.

In some implementations, computing devices 105 may include a remote control application (or multiple remote control applications) 115A provided by a third-party provider to receive information for devices 135A-C and submit commands to control the devices 135A-C. Alternatively, or additionally, computing devices 105 may interface with a third party service 162 that includes a remote control application 115B to receive information for devices 135A-C and/or to submit commands to control the devices 135A-C. For example, a computing device 105 may receive voice data from a user and send the voice data to a third-party service 162 of server computing device(s) 125B. Third party service 162 may perform speech processing operations to convert the voice data into text data, and may determine a command from the text data. The command may specify a particular device 135A-C and an action to perform on the device 135A-C, which may cause property values of one or more properties of the device 135A-C to change. In some embodiments, the remote control application 115A is configured to interface with one or more third-party services 162. In some implementations, remote control application 115A may provide an interface to intelligent personal assistant services (e.g., third-party services 162) such as Amazon Alexa®, Apple Siri®, Google Assistant®, or the like. In some implementations, remote control application 115A may provide an interface to an intelligent home assistant framework that monitors and controls various connected devices within the home such as Apple Home®, Xfinity Home®, and/or commercial home security monitoring systems.

The remote control application 115A may be programmed to run on various operating systems, such as Windows® operating systems, Unix® operating systems, iOS® operating systems, Android® operating systems and Java® operating systems to name a few. The remote control application 115A may also be configured as firmware, or as hardware, or as some combination of software, firmware and/or hardware. In some embodiments, the remote control application 115A may include a graphical user interface (GUI) that enables users to interact with and control devices 135A-C in an intuitive and user-friendly manner. A user may interact with the GUI to cause the remote control application 115A to obtain the state of, and send commands to, the devices 135A-C represented in the GUI.

Server computing devices 125B include one or more third-party services 162. Third-party services 162 may be services provided by entities other than a provider of an IoT platform that includes WAN accessible services 130. Third-party services 162 may be associated with the third-party entity that supports computing devices 105 and/or remote control application 115A. Alternatively, or additionally, third-party services 162 may include an intelligent personal assistant service such as Amazon Alexa®, Apple Siri®, Google Assistant®, or the like. The third-party services 162 may additionally or alternatively include a hosted service that provides an interface to a remote control application (e.g., remote control application 115), a hosted service that provides an interface to a home security system, or the like. As shown, server computing devices 125B may connect to server computing device 125A directly or via WAN 170.

In some implementations, third-party services 162 may maintain particular properties and/or communication protocols that may be used to communicate with and otherwise control compatible connected devices 135A-C. For example, to control a variable rotation speed fan using a voice command via computing device 105, third-party services 162 may support particular voice commands (e.g. "increase fan speed by 25 percent"), and apply the use of an application program interface (API) that supports particular property values for devices settings. For example, if a user issues a voice command to "increase fan speed by 25 percent," third-party services may specify that the value "25" is sent to the service supporting the device.

In some implementations, the properties and commands supported by third-party services 162 may not be directly compatible with the properties and commands supported by WAN accessible services 130 or by the devices 135A-C. For example, third-party services 162 may maintain fan speed properties of 0, 25, 50, 75, and 100, whereas an OEM vendor for a fan may support fan speed properties of 0, 1, 2, 3, and 4. In one embodiment, WAN accessible services 130 includes a template manager 126 and a virtual device manager 128 to facilitate transformation of device template properties and command behaviors between third-party services 162 and devices 135A-C. The template manager 126 creates, modifies and otherwise manages a pool of device templates. Template manager 126 may generate and/or modify device templates without users performing any programming. In one embodiment, template manager 126 provides a user interface (e.g., a graphical user interface) that enables users to easily define device properties in a device template. Template manager 126 may receive a base device template associated with a device 135A-C, identify a device type associated with a supported third-party service, and generate an adapter template that provides a translation mapping of property values and behaviors between the third-party service and the OEM device.

Each device template defines one or more properties for a device 135A-C. The properties may be physical attributes that are hard wired, hard coded or manufactured into the device 135A-C as well as logical attributes that may include business logic such as behaviors, notifications, rules, access control, derived properties, and so on for the device. Examples of physical attributes include sensors and sensor capabilities, input devices (e.g., buttons) and operations of the input devices, output devices (e.g., speakers, a display, etc.) and operations of the output devices, servos and servo settings, motors and motor settings, and so forth. Physical attributes may additionally include capabilities, behaviors, characteristics, etc. of firmware and/or software that is loaded into the devices 135A-C (e.g., into embedded systems 150A-C) in the devices.

Each device template may additionally define one or more logical or behavioral attributes for a device 135A-C. Logical attributes (also referred to as behavioral attributes) may include business logic such as behaviors, notifications, rules, access control, derived properties, and so forth that may not be programmed into a device. The logical attributes may instead be provided by a virtual device 185A-C on behalf of a physical device 135A-C. For example, a fan may have fan speed set points and controls for changing the fan speed set points. A virtual device established for the fan may include a rule stating that the fan speed may only be increased in increments of 10 percent. The virtual device may change the speed set point internally and may send a command to the physical device to change the set point to the selected speed on the physical device. In this example, the fan speed set point and the controls usable to set the fan speed set point would be considered physical attributes of the physical device, and the rule for controlling the set point would be considered a logical attribute assigned to the physical device.

The template manager 126 additionally associates templates to devices 135A-C. In one embodiment, template manager 126 associates each type of device with a particular template or combination of templates. A device type may include a particular manufacturer (OEM), a particular model number and/or a particular version number (e.g., a firmware version number). Thus, different templates may be used based on manufacturer, device model and/or firmware version.

The template manager 126 may additionally generate and maintain third-party device type templates, device rule templates and/or adapter templates. A third-party device type template may represent an abstraction of a device template, and may include properties of a device as understood or used by a third-party system. A device rules template may represent the allowable states of a device, actions that may be performed on the device, and rules for transitioning between the various states of the device (from the perspective of the third-party system and/or from the perspective of the device and/or OEM of the device). An adapter template may include data from one or more of the device template, third-party device type template and/or device rule template, and may be configured for a combination of a specific device and third-party system.

Virtual device manager 128 generates an instance of a virtual device 185A-C for each physical device 135A-C. The physical devices 135A-C may each have the same device type or may have different device types from the same or different manufacturers. For example, a separate virtual device 185A-C may be created for each unit of a particular product of an OEM. Each virtual device 185A-185C is generated from one or a set of device templates. The created virtual device 185A-C inherits device properties (e.g., logical and physical attributes) from each of the device templates used to create the virtual device. The virtual device 185A-C is then connected to a particular physical device 135A-C (e.g., to an embedded system 150A-C of a particular physical device 135A-C), and may be used to monitor, interface with, and control that physical device.

As noted above, the properties and behaviors for the device may not be directly compatible with the properties and behaviors supported by third-party services 162. Template manager 126 may use the information from the device template for the device as well as information from a third-party device type associated with third-party services 162 to generate an adapter template that facilitates compatible communication between devices 135A-C and third-party services 162. An example of mapping a device template and third-party device type to generate an adapter template is described below with respect to FIG. 4E and FIG. 6.

In some implementations, adapter service 131 uses an adapter template to facilitate communication between the virtual devices 185A-C (and, in turn, the devices 135A-C) and the third-party services 162. Adapter service 131 may additionally or alternatively use an adapter template to facilitate communication between a first third party service that interfaces with a user and a second third party service that interfaces with a device 135A-C in instances where WAN accessible services 130 do not interface with the device 135A-C. Adapter service 131 may receive commands from third-party services 162, and use the translation information in the adapter template described above to translate a command received from third party services 162 to a set of behaviors and/or property settings compatible with devices 135A-C that can be provided to virtual devices 185A-C.

Virtual devices 185A-C may interface with adapter service 131 on behalf of associated physical devices 135A-C. Virtual devices 185A-C may interface with the adapter service 131 to obtain information usable to update the devices. Additionally, virtual devices 185A-C may interface with the adapter service 131 to provide notifications and information about physical devices 135A-C. The virtual devices 185A-C may then format the commands into a protocol used by associated physical devices 185A-C and/or generate new commands in such a protocol. The virtual devices 185A-C may then send the new or modified commands to associated physical devices 135A-C (e.g., via the devices' embedded systems 150A-C) to control the physical devices 135A-C.

In some implementations, adapter templates may maintain the various state transition rules for the associated device 135A-C, such as in the form of a state data structure. Additionally or alternatively, each virtual device 185A-C may maintain a separate state machine for its associated device 135A-C. The state data structure of an adapter template for a device 135A-C may be constructed using a domain specific language in embodiments. The state data structure may be more than a simple table, and may include, for example, multiple rules that govern state transitions. In one embodiment, an instance of the adapter service 131 may be instantiated for each device 135A-C that is configured to communicate with third-party services 162. The state data structure may receive state settings from the associated virtual device 185A-C, and access the state transition rules associated with the third-party device type in order to determine the appropriate changes to device state and update of device attributes.

Figure 2:
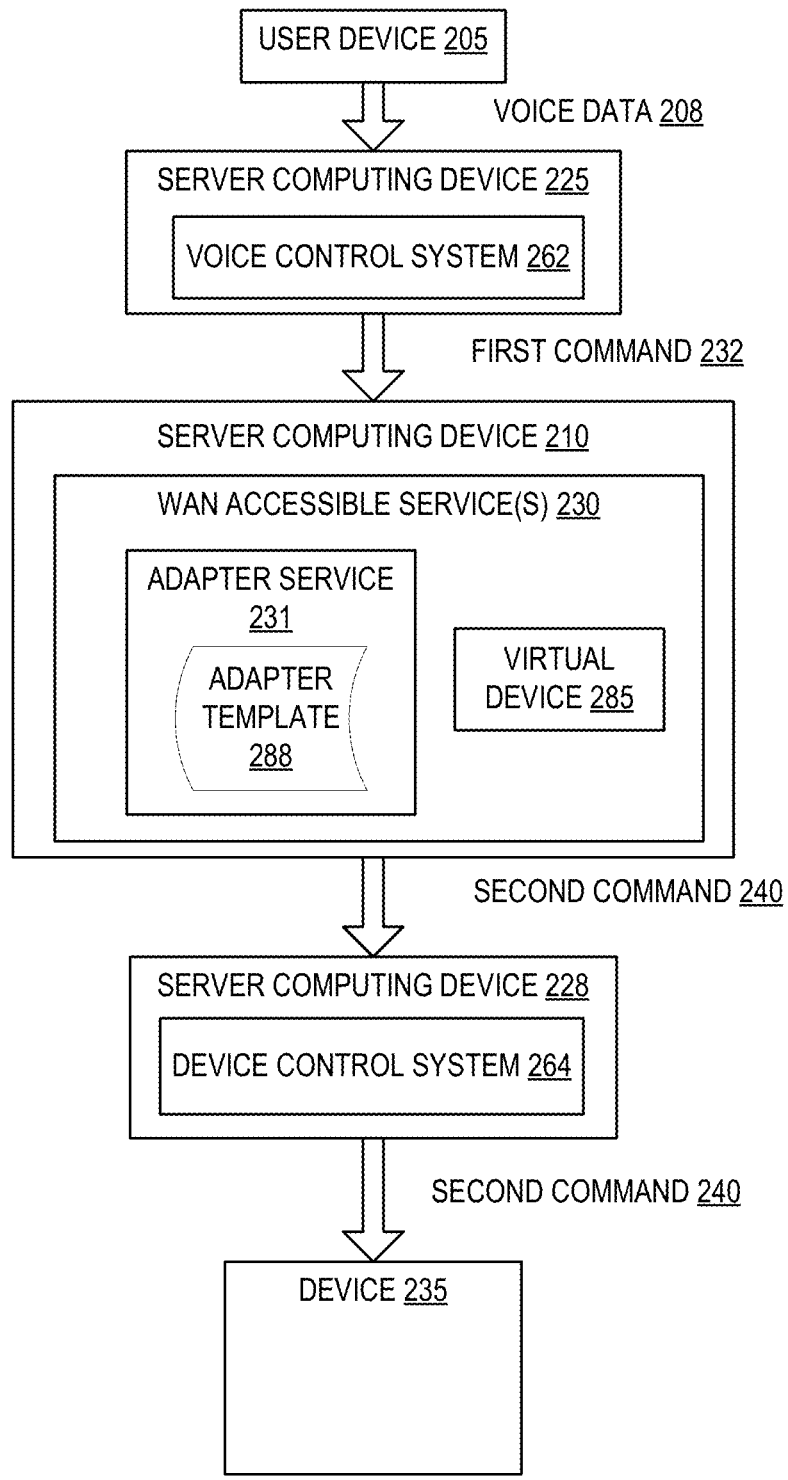
FIG. 2 is a block diagram depicting control of a device via a third-party voice control system, in accordance with embodiments of the present disclosure.

FIG. 2 is a block diagram of a network architecture 200 depicting control of a device 235 via a third-party voice control system 262, in accordance with embodiments of the present disclosure. The network architecture 200 includes a user device 205, a server computing device 225, a server computing device 210, a server computing device 228 and a device 235.

User device 205 may be a voice controlled device such as an Amazon Echo, a Google Home or an Apple HomePod. The user device 205 may also be a mobile device such as a mobile phone that includes a voice command application installed thereon. The user device 205 receives voice data 208 and sends (e.g., streams) the voice data 208 to server computing device 225. Server computing device 225 includes a voice control system 262 such as Amazon Alexa, Apple Siri, Microsoft Cortana, and so on. The voice control system 262 performs speech processing on the voice data 208 to convert the voice data 208 into text data that is representative of the voice data. The voice control system 262 additionally determines a user intent from the text data, where the user intent includes an identification of device 235 and an action to perform on the device 235.

Voice control system 262 generates a first command 232 that comprises an instruction to change a property of the device 235. The first command 232 may have a format that conforms to a data model of the voice control system, and may refer to the device using a first property and a first property value for the first property. In embodiments, the first command includes an identification of one or more properties used by the voice control system 262 to represent the device and one or more new property values for the one or more properties. However, the device 235 may not be able to update based on the first command 232 because the device 235 may use a second data model and may be controllable by commands having a second format that conforms to the second data model. Accordingly, server computing device 225 may send the first command 232 to server computing device 210.

Server computing device 210 includes one or more WAN accessible services 210, which include an adapter service 231 and a virtual device 285. Adapter service 231 may include or have access to an adapter template 288 that was created for translating commands and data between the first format and data model usable by voice control system 262 and the second format and data model usable by device 235 and/or by virtual device 285. The adapter template may include a first mapping of first commands to first actions on one or more properties used by the voice control system to represent device 235 and/or a second mapping of the first commands on the one or more properties used by the voice control system to represent the device to second commands on one or more additional properties used by the WAN accessible services 230 (e.g., by virtual device 285) to represent the device 235. The adapter template may also include the one or more properties and/or the one or more additional properties as well as mappings between the one or more properties and the one or more additional properties.

Adapter template 288 may include the one or more state transition rules that may govern what new states the device may transition to based on a current state of the device and/or a command. Each state may include property values for one or more properties of the device as used by the voice control system and/or property values for one or more additional properties of the device as used by the device and/or the WAN accessible services 230. Adapter template 288 may additionally include one or more properties usable by the voice control system to represent the device, where each property may have a property type and one or more allowable property values. Each property may map to one or more commands in the state transition rules. Additionally, a state transition rule may map a command to particular property values and/or changes in property values of one or more properties. The adapter template 288 may define the physical device 235 under control in terms of state machine elements, the state machine elements comprising a plurality of states, one or more rules that specify allowable transitions between the plurality of states, and one or more actions and/or commands that cause the physical device to transition between the plurality of states.

In one embodiment, the adapter template 288 is a three level object that encapsulates behavior of the physical device under control of the voice control system 262 (or other third-party system) as a state machine. The three level object may include a template level represented by a first table, a command level represented by a second table comprising a first plurality of rules associated with the voice control system (or other third-party system), and a property level represented by a third table comprising a second plurality of rules associated with an additional service (e.g., a WAN accessible service 230) that interfaces with the device 235.

Adapter service 231 uses the adapter template 288 to determine a translation to translate the first command understood by the voice control system 262 into a second command understood by the virtual device 285, a third-party device control system 264 and/or device 235. Adapter service 231 may then generate a second command 240 based on the translation. The second command may include an instruction to change a property value for one or more property of the device 235.

Adapter service 231 may send the second command 240 to virtual device 285. Virtual device 285 may then update one or more properties of the virtual device based on the second command 240. Virtual device 285 (or another WAN accessible service 230) may send the second command 240 to server computing device 228, which may host the third-party device control system 254. The device control system 264 may be, for example, a cloud service provided by Nest® or another IoT device manufacturer. The device control system 264 may then send the second command 240 on to the device 235 to update the one or more property of the device 235. In an alternative implementation, virtual device 285 may send the second command 240 to device 235, bypassing server computing device 228.

Figure 3:
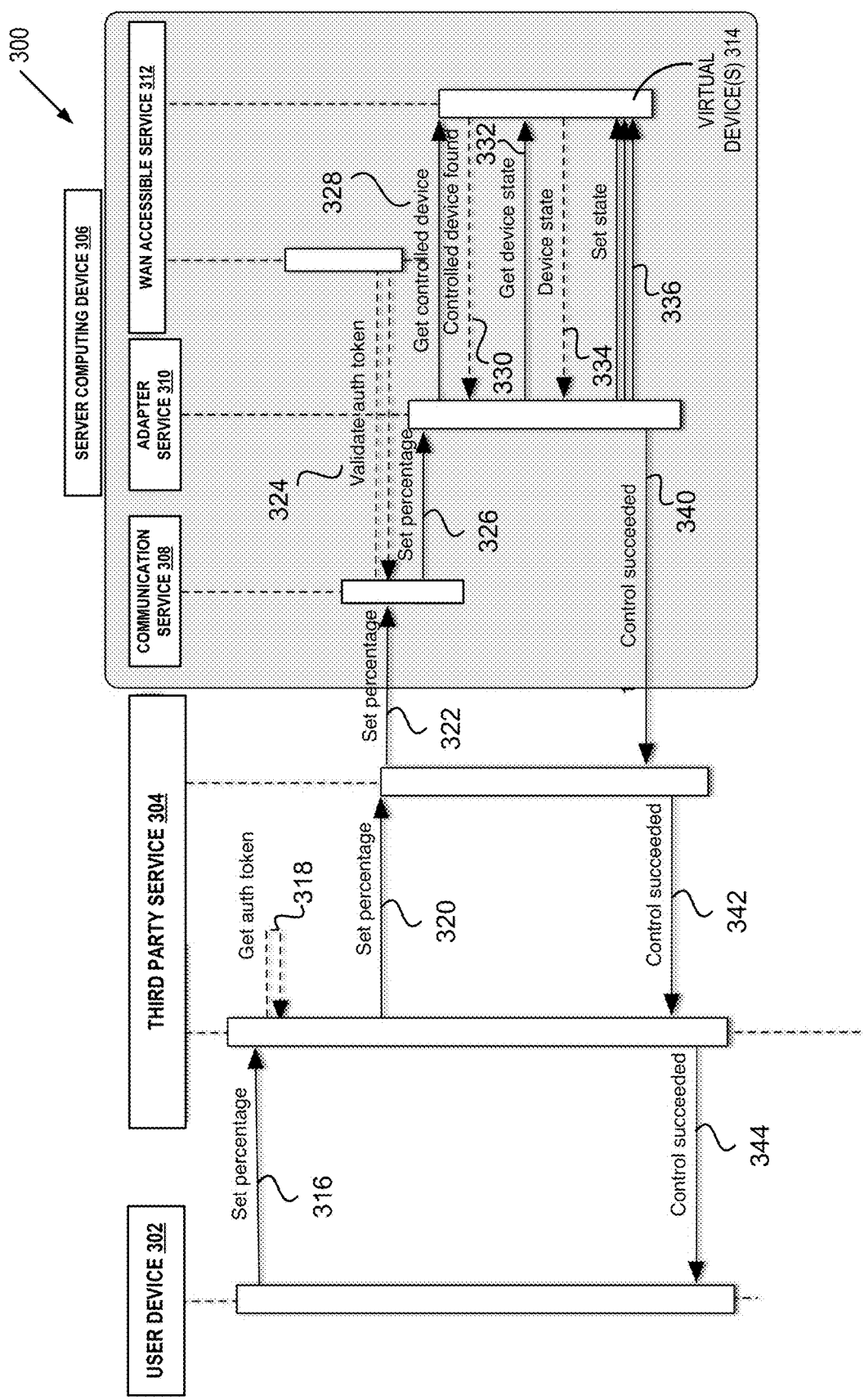
FIG. 3 is a sequence diagram depicting an interaction between a user and a connected device using a third-party application, in accordance with embodiments of the present disclosure.

FIG. 3 is a sequence diagram depicting an interaction 300 between a user device 302 and a connected device using a third-party service, in accordance with embodiments of the present disclosure. In an illustrative example, a user device 302 may receive a voice command from a user to set the speed percentage of a connected fan, and may send the voice command to a third party service 304 (operation 316). The user device 302 may be connected to the third-party service 304 (e.g., third-party service 162 of FIG. 1) that provides an intelligent personal assistant service that supports user device 302. In some implementations, the third-party service 304 may authenticate the user by obtaining an authentication token before proceeding (operation 318). Third-party service 304 may forward the set percentage command through one or more communication layers within the third-party service (operation 320) and subsequently forward the command to the server computing device 306 that hosts the WAN accessible service 312 (e.g., WAN accessible service 130 of FIG. 1) that manages the connected device.

In some implementations, the command may be received by a communication service component 308 (operation 322), and validated with the WAN accessible service 312 before proceeding (operation 324). The command may then be sent to the adapter service 310 (e.g., adapter service 131 of FIG. 1) (operation 326). As noted above, adapter service 310 may have been generated to incorporate a mapping of device attributes for the OEM fan manufacturer against those attributes supported by third-party service 304. Similarly, the adapter service 310 may include the command behaviors supported by the third-party service 304 and the corresponding device behaviors that may be executed to affect change in the connected fan.

The adapter service 310 may first send a request to obtain access to the virtual device associated with the connected device (operation 328). Once access to the virtual device has been successfully obtained (operation 330), the adapter service 310 may then send a request to the virtual device 314 to obtain the current device state for the device (operation 332). Once the device state is obtained (operation 334) the adapter service 310 may then use the state machine logic and device property mappings stored in the adapter template to execute the appropriate behavior associated with the third-party service 304 to conduct the state transition for the fan (operation 336). This may include generating a new command that corresponds to the original command, but that has a different format that corresponds to a data model used by the OEM for the device.

For example, as noted above, the third-party service 304 may specify that the fan may only be controlled by that service by modifying the speed in increments of 25 percent. These rules may be stored in the appropriate adapter template and state machine rules logic. So, if the fan is currently rotating at 25 percent, and a user issues a voice command to increase the speed of the fan by another 25 percent, third-party service may send information to adapter service 310 that indicates the speed of the fan should be increased by 25.

The adapter service 310 may then access the attribute mapping in the adapter template for the fan and discover that the available speed settings for the fan that are supported by the third-party service are '0', '25%', '50%', '75%', and '100%'. The adapter service 310 may invoke the device state machine logic in the adapter template to communicate with the virtual device to determine the current fan speed. As noted previously, the fan speed attributes for the fan may be different from the attributes for the third-party service 304. For example, the fan manufacturer may support speed settings of '0', '1', '2', '3', and '4'. Thus, if the fan is currently operating at 25 percent, the adapter service may receive a value of '1' from the associated virtual device, which translates to the third-party attribute equivalent of '25'. Subsequently, device state machine 132 may access the third-party state transition rules for the fan from the adapter template to determine that when the fan is set to '25' and a command is received to increase the speed to '25', the adapter service should set the speed to 50 percent (25 higher than 25 percent). The adapter service 310 may then translate the property value of 50 to the device's equivalent property value (e.g., '3') and send a command to the virtual device to set the speed property to '3'.

In some implementations, adapter service may then receive a notification/acknowledgment from the fan that the command was processed successfully and forward that acknowledgment to the third-party service (operations 340 and 342), which may subsequently provide an equivalent notification to the user via the user device and/or a remote control application (operation 344).

Figure 4E:
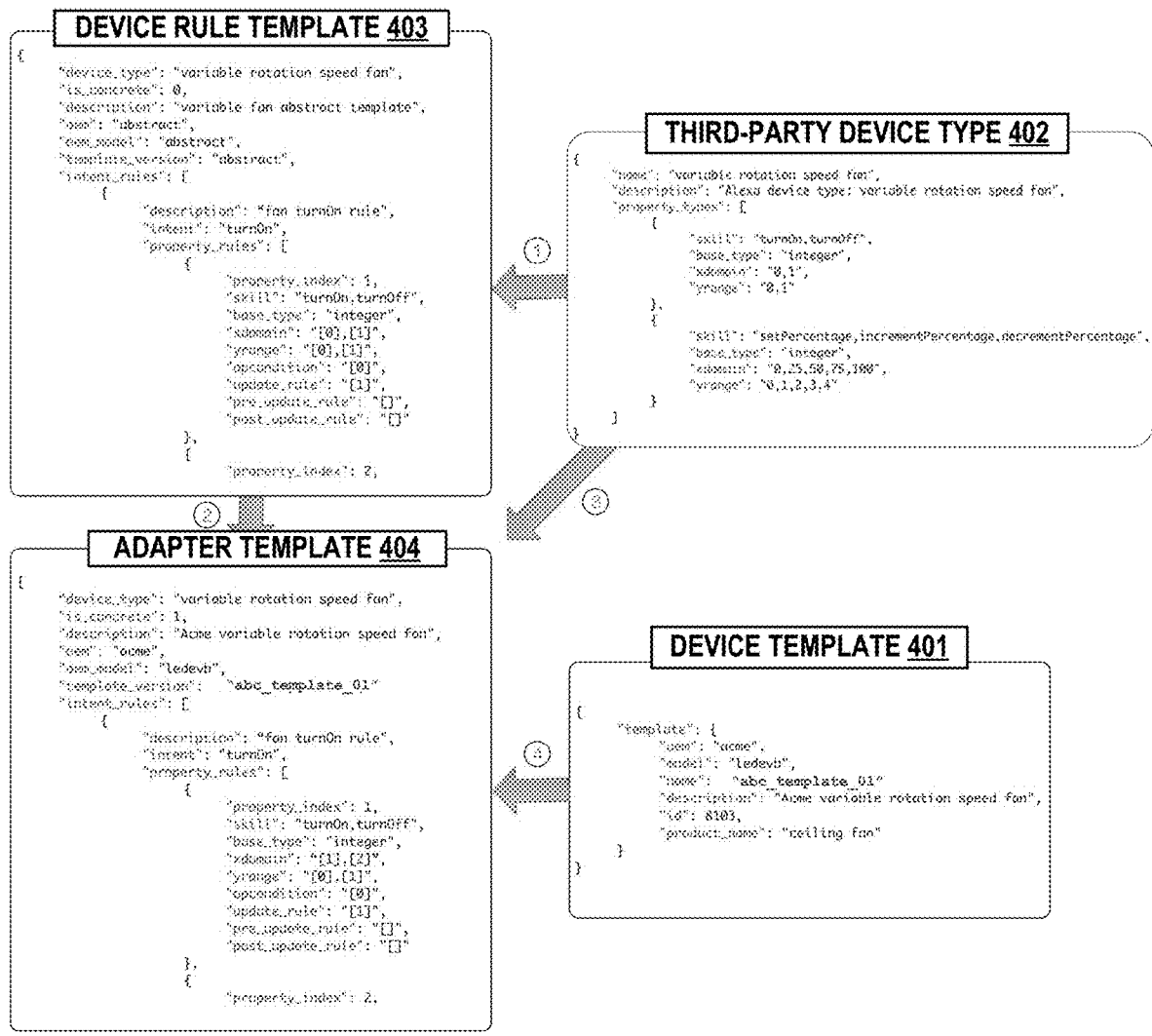
FIG. 4E is a block diagram depicting template relationships, in accordance with embodiments of the present disclosure.

FIGS. 4A-E illustrate various templates and their relationships, including a third party device type, a device template, a device rule template and an adapter template, in accordance with embodiments of the present disclosure. FIG. 4A illustrates an example third party device type 402, in accordance with embodiments of the present disclosure. The third-party device type 402 is a template for a particular type of device as represented in a third-party system. The example third-party device type 420 illustrated is for a variable rotation speed fan. The third-party device type 402 includes a name of the device type, a description, and one or more property types. Each property type includes a skill, a base type, an xdomain and a yrange. The skill represents one or more commands that may be issued on the property type. The base type indicates acceptable property values for the property type (e.g., integers, alphanumeric, Boolean, etc.). The xdomain includes acceptable property values for the third-party system and the yrange represents default property values for the WAN accessible services and/or OEM and/or device. In the illustrated example, the third-party device type 402 includes first property type having a skill for turn on and turn off, an integer base type, an xdomain of 0,1 and a yrange of 0,1. The example third-party device type 402 further includes a second property type having a skill for set percentage, increment percentage and decrement percentage, an integer base type, an xdomain of 0, 25, 50, 75, 100 and a yrange of 0,1,2,3,4.

FIG. 4B illustrates a portion of an example device template 401, in accordance with embodiments of the present disclosure. The example device template is for an OEM entitled Acme, for model number ledevb, has a template name "Acme variable rotation speed fan", has a template ID of 8103, and has a product name of "ceiling fan." The device template 401 may additionally include a base type (e.g., having an integer value) and one or more properties that may correspond to the one or more property types in the third-party device type 402.

FIG. 4C illustrates a portion of an example device rule template 403, in accordance with embodiments of the present disclosure. The device rule template 403 is associated with device type 402. The example device rule template 403 includes a device type property that references the variable rotation speed fan device type 402. The device rule template 403 may additionally include default values for a concrete property, an OEM property, an OEM model property and/or a template version property. Additionally, the device rule template includes one or more intent rules that govern what commands the device type can receive and what properties to change based on those commands. Each of the intent rules may map a particular command or set of commands to one or more device properties and one or more property values of the one or more device properties. The intent rules may additionally include conditions that may govern when the rules may be applied. The intent rules may additionally include references to other rules to also apply and/or that must first apply before applying a particular intent rule.

FIG. 4D illustrates a portion of an example adapter template 404, in accordance with embodiments of the present disclosure. As shown, the adapter template 404 is similar to the device rule template 403, but includes customized configuration information that is based on a merging of the device rule template 403 (associated with the third party device type 402) and the device template 401. The device rule template 403 and third-party device type 402 may include default settings for one or more properties. These default settings may be replaced with customized settings as part of the merging of these templates with the device template to create the adapter template. Additionally, one or more settings such as the yrange settings for one or more properties (property types) may be customized, replacing default values from the third party device type 402 and/or device rule template 403.

FIG. 4E is a block diagram depicting template relationships, in accordance with embodiments of the present disclosure. In one embodiment the templates depicted in FIG. 4E may be accessed and/or generated by a template manager such as template manager 126 of FIG. 1, and utilized by an adapter service such as adapter service 131 of FIG. 1.

As shown in FIG. 4E, a template manager may receive a device template 401 that includes attributes and behaviors supported by a connected device as defined by the device manufacturer. The device template 401 may be provided by the device manufacturer, may be entered by a user with administrative access to the wan accessible service that supports the connected device (e.g., wan accessible service 130 of FIG. 1), or in any similar manner. For example, as shown in FIG. 4E, device template 401 is associated with a variable rotation speed fan produced by OEM "acme". The template manger, upon receiving a request to enable the "acme" fan for use with the third-party service "abc", may search for any device types associated with the "abc" service that support a variable rotation speed fan. To provide access to the device by a third-party service (e.g., third-party service 162 of FIG. 1), the template manager may identify third-party device type 402 that represents the equivalent "abc" device type class (variable rotation speed fan) for the device associated with the device template 401. Third-party device type 402 (as well as any other device types for "abc" service or other third-party services within the platform) may be provided by the third-party service, entered by an administrator of the platform, or in any similar manner.

As shown in FIG. 4E, and as described above with respect to FIG. 1, the third-party device type 402 presents the "view" of a device with respect to interactions with the API of the third-party service or system. Here, third-party device type 402 includes two property types: properties associated with powering on and powering off the fan, and properties associated with setting the fan speed percentage. Additionally, third-party device type 402 includes associated actions that may be invoked via communication with the third-party service to control the fan device. Notably, third-party device type 402 does not fully define the functional behaviors of these actions, but only the components that are to be invoked to execute those behaviors.

The template manager may then identify a device rule template 403 that is associated with the third-party device type 402. As with the third-party device type 402, the device rule template 403 may be may be provided by the third-party service, entered by an administrator of the platform, or in any similar manner. The device template may describe the physical device using one or more device properties, while the device rule template may describe one or more additional device properties of the device in terms of their relation to commands (e.g., such as voice commands).

As shown in FIG. 4E, the device rule template 403 may define the device behaviors specified by the third-party service that may be used to control the device using the third-party service. The device rule template 403 includes the default property settings for the third-party device type and state transition rules in relation to those property settings. In some implementations, the device rule template 403 includes the encoded state machine transition rules that are used to perform the applicable device state transitions. Alternatively, the device rule template 403 may include commands to access a data store accessible to the platform where the specific device state transition rules may be stored. The device rule template 403 may be used as a default template for any variable rotation speed fan where the user wishes to connect that fan to the "abc" third-party service.

Once a device rule template 403 for the device has been identified, template manager may then generate an adapter template 404 specifically for the "acme" variable rotation speed fan specified by device template 401. As shown in FIG. 4E, adapter template 404 includes the properties of the third-party device type (from third-party device type 402), as well as the corresponding property values associated with the "acme" variable rotation speed fan (from device template 401) and information from the device rule template 403. Thus, the adapter template 404 provides an association between the rules of the third-party service ("abc") and the OEM ("acme") device template.

When a device is added to the platform, the template manager may generate the adapter template 404 that can be used by the adapter service (e.g., adapter service 131 of FIG. 1) to facilitate communication between the third-party service and the connected device.

Figure 5:
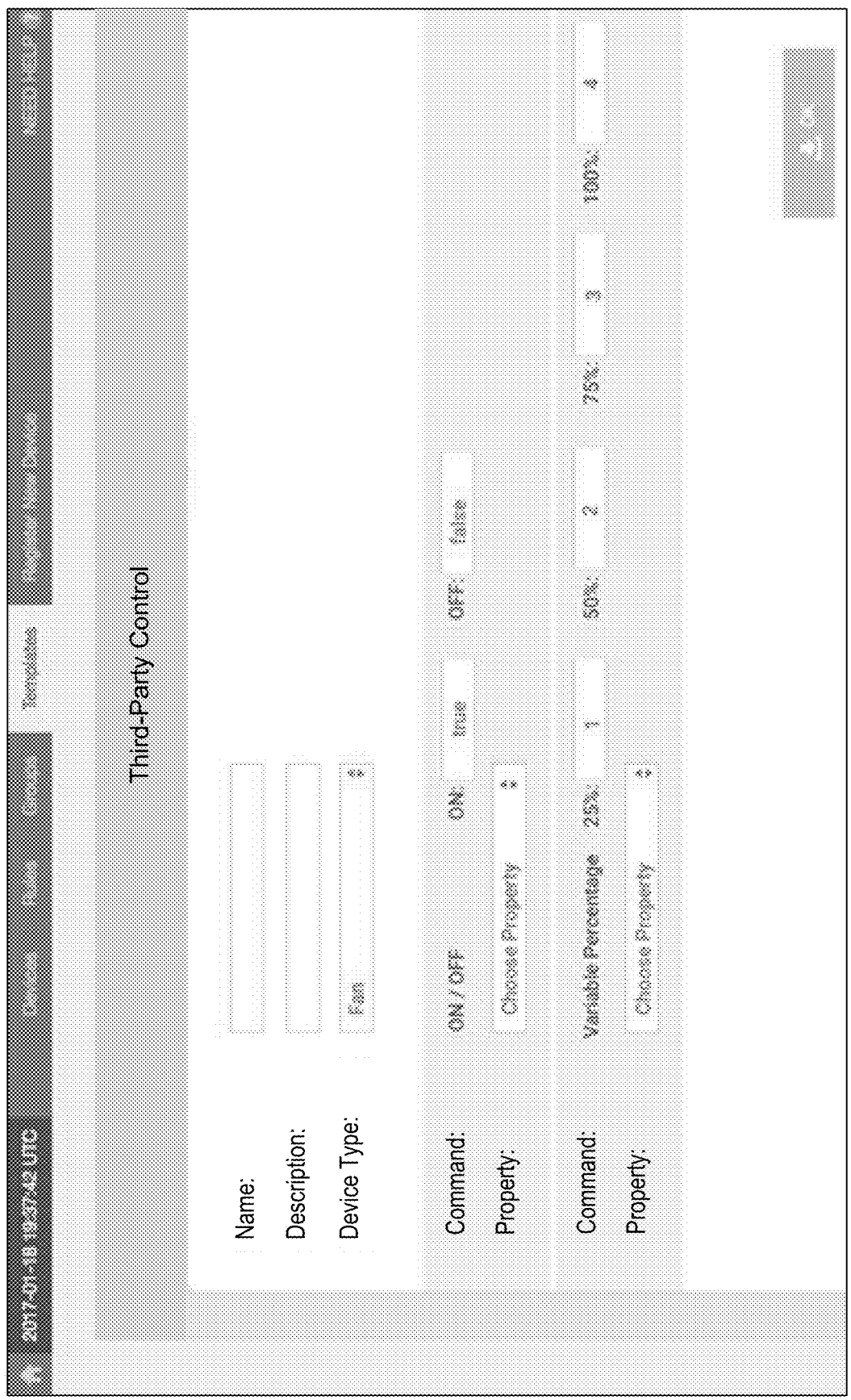
FIG. 5 is a screen shot of a graphical user interface for generating adapter templates, in accordance with embodiments of the present disclosure.

FIG. 5 is a screen shot of a graphical user interface for generating adapter templates, in accordance with embodiments of the present disclosure. As part of generation of the adapter template, a user may be presented with a graphical user interface (GUI) that enables a user to select one or more property values for one or more properties of a device. The selected property values may be the property values that are usable by the OEM and/or device. These property values may correspond to a data model used for the device by the OEM and/or WAN accessible services. The GUI enables adapter templates to be generated for devices via a configuration process, which may be performed without a user performing any programming tasks.

Figure 6:
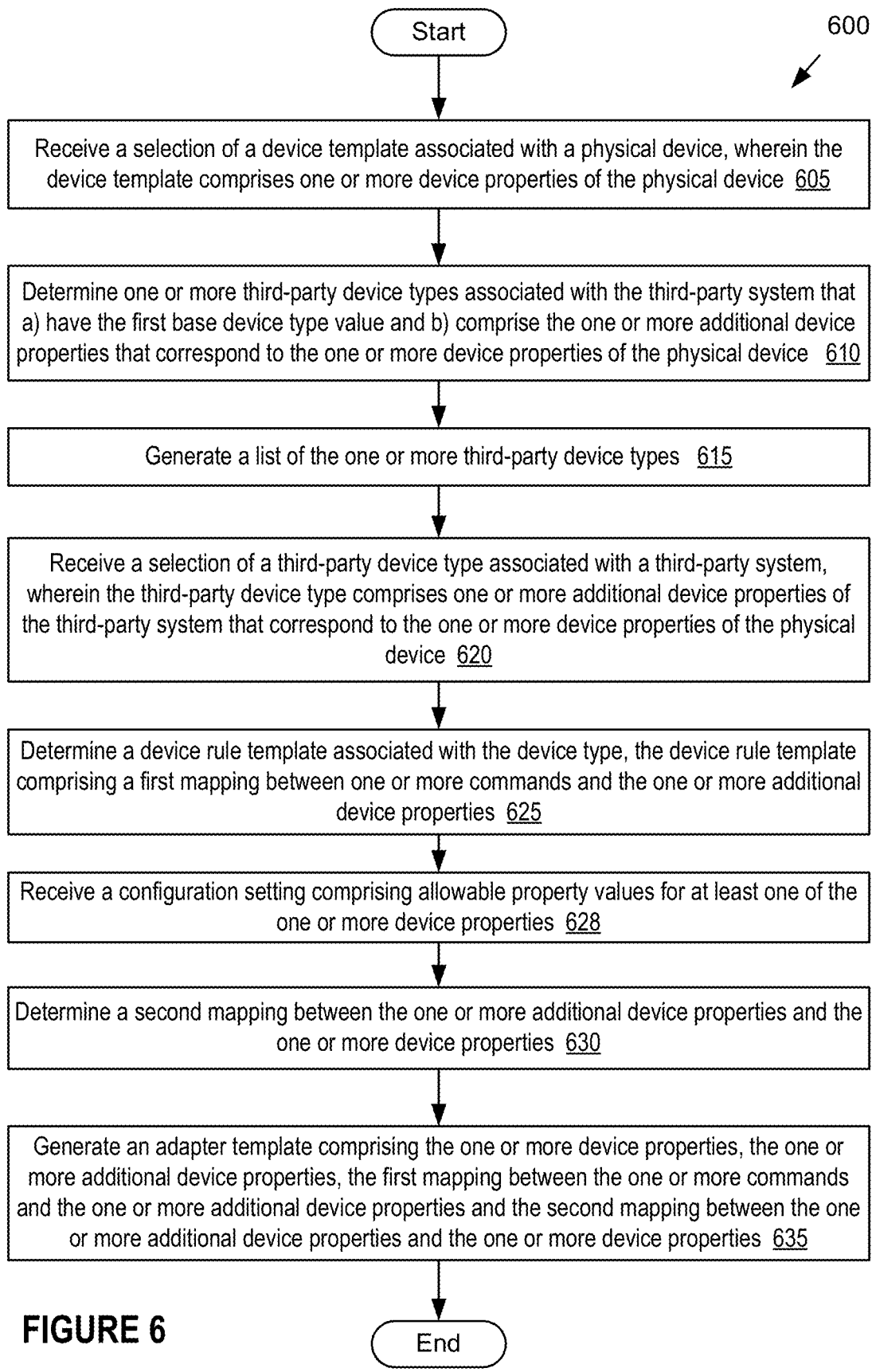
FIG. 6 is a flow diagram illustrating one embodiment for a method of generating an adapter template.
Figure 7:
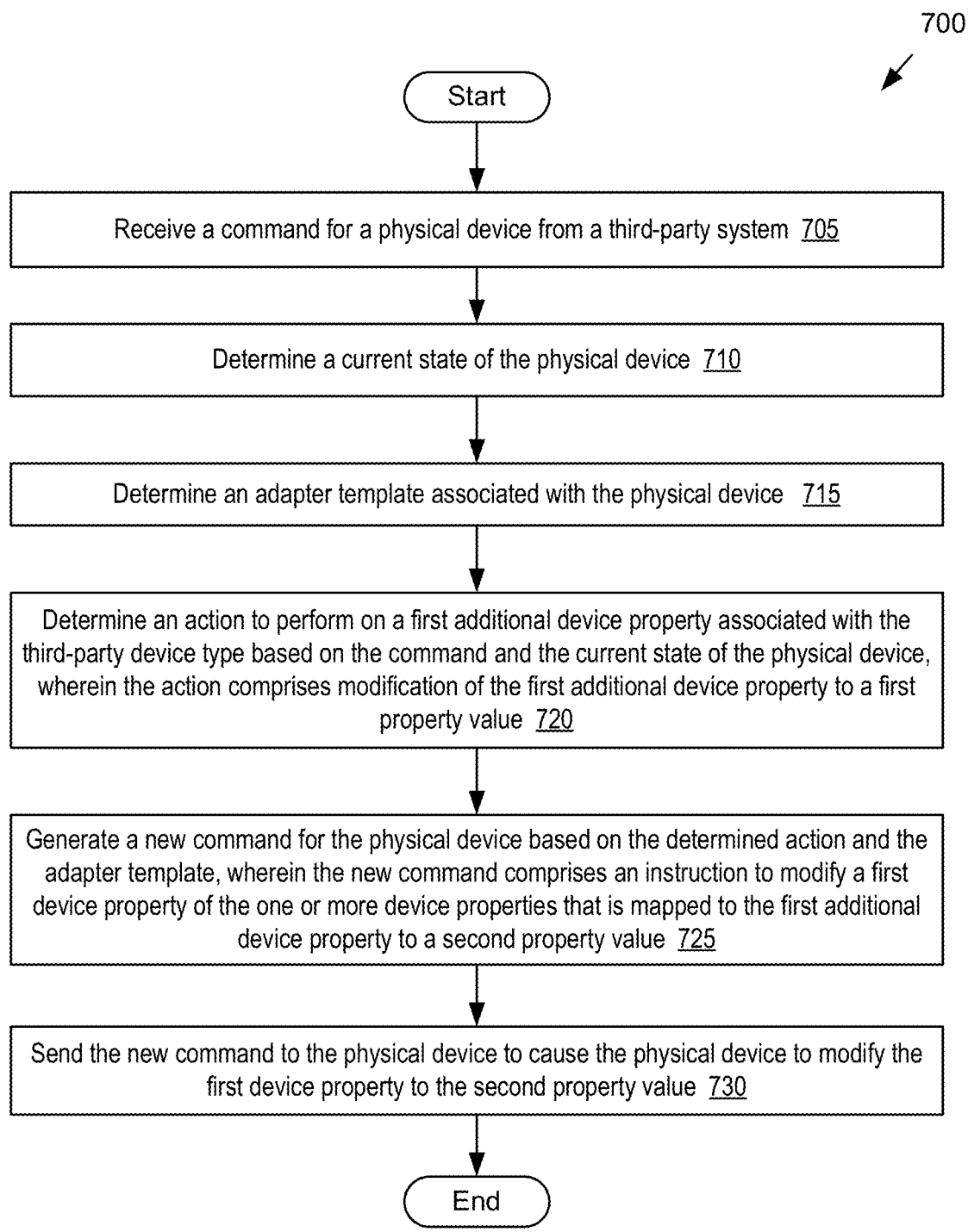
FIG. 7 is a flow diagram illustrating one embodiment for a method of using an adapter template to control a device.

FIGS. 6-7 are flow diagrams of various embodiments of methods for generating and using adapter templates. The methods are performed by processing logic that may include hardware (circuitry, dedicated logic, etc.), software (such as is run on a general purpose computer system or a dedicated machine), firmware, or some combination thereof. In one implementation, the methods may be performed by a server computing device 125A of FIG. 1 (e.g., by an adapter service 131 running in server computing device 125).

For simplicity of explanation, the methods are depicted and described as a series of acts. However, acts in accordance with this disclosure can occur in various orders and/or concurrently, and with other acts not presented and described herein. Furthermore, not all illustrated acts may be performed to implement the methods in accordance with the disclosed subject matter. In addition, those skilled in the art will understand and appreciate that the methods could alternatively be represented as a series of interrelated states via a state diagram or events.

FIG. 6 is a flow diagram illustrating one embodiment for a method 600 of generating an adapter template. At block 605 of method 600, processing logic receives a selection of a device template associated with a physical device, wherein the device template comprises one or more device properties of the physical device. The device template may include a first base device type (e.g., for a variable speed fan). At block 610, processing logic may determine one or more third-party device types associated with the third-party system that a) have the first base device type value and b) comprise the one or more additional device properties that correspond to the one or more device properties of the physical device. At block 615, processing logic may generate a list of the one or more third-party device types.

At block 620, processing logic receives a selection of a third-party device type associated with a third-party system, wherein the third-party device type comprises one or more additional device properties of the third-party system that correspond to the one or more device properties of the physical device. At block 625, processing logic determines a device rule template associated with the device type, the device rule template comprising a first mapping between one or more commands and the one or more additional device properties.

At block 628, processing logic may receive a configuration setting comprising allowable property values for at least one of the one or more device properties. The configuration setting may be received via a graphical user interface, for example as part of an adapter template configuration flow.

At block 630, processing logic determines a second mapping between the one or more additional device properties and the one or more device properties. Determining the second mapping between the one or more additional device properties and the one or more device properties may include determining mappings between allowable property values for each of the one or more additional device properties and the allowable property values for the one or more device properties. At block 635, processing logic generates an adapter template comprising the one or more device properties, the one or more additional device properties, the first mapping between the one or more commands and the one or more additional device properties and/or the second mapping between the one or more additional device properties and the one or more device properties.

FIG. 7 is a flow diagram illustrating one embodiment for a method 700 of using an adapter template to control a device. At block 705 of method 700, processing logic receives a command for a physical device from a third-party system. At block 710, processing logic determines a current state of the physical device, such as by querying a virtual device associated with the physical device. The virtual device may maintain a current state of the physical device.

At block 715, processing logic determines an adapter template associated with the physical device. At block 720, processing logic determines an action to perform on a first additional device property associated with the third-party device type based on the command and the current state of the physical device, wherein the action comprises modification of the first additional device property to a first property value. The action may be an adjustment to one device property or to multiple device properties and/or may be based on property values of one or more device properties. For example, if the command was "set fan speed to 0%", then the action may be to set the power device property to an "off" values. The action may depend on a current state of the device as represented in a state machine. For example, if the command is "increase fan speed by 50%", then the current fan speed would be determined from the state machine before determining the new fan speed setting for the device and generating an action to adjust the fan speed property to that new fan speed setting.

At block 725, processing logic generates a new command for the physical device based on the determined action and the adapter template, wherein the new command comprises an instruction to modify a first device property of the one or more device properties that is mapped to the first additional device property to a second property value. At block 730, processing logic send the new command to the physical device to cause the physical device to modify the first device property to the second property value. Alternatively, processing logic may send the new command to a third party system that interfaces with the physical device.

Figure 8:
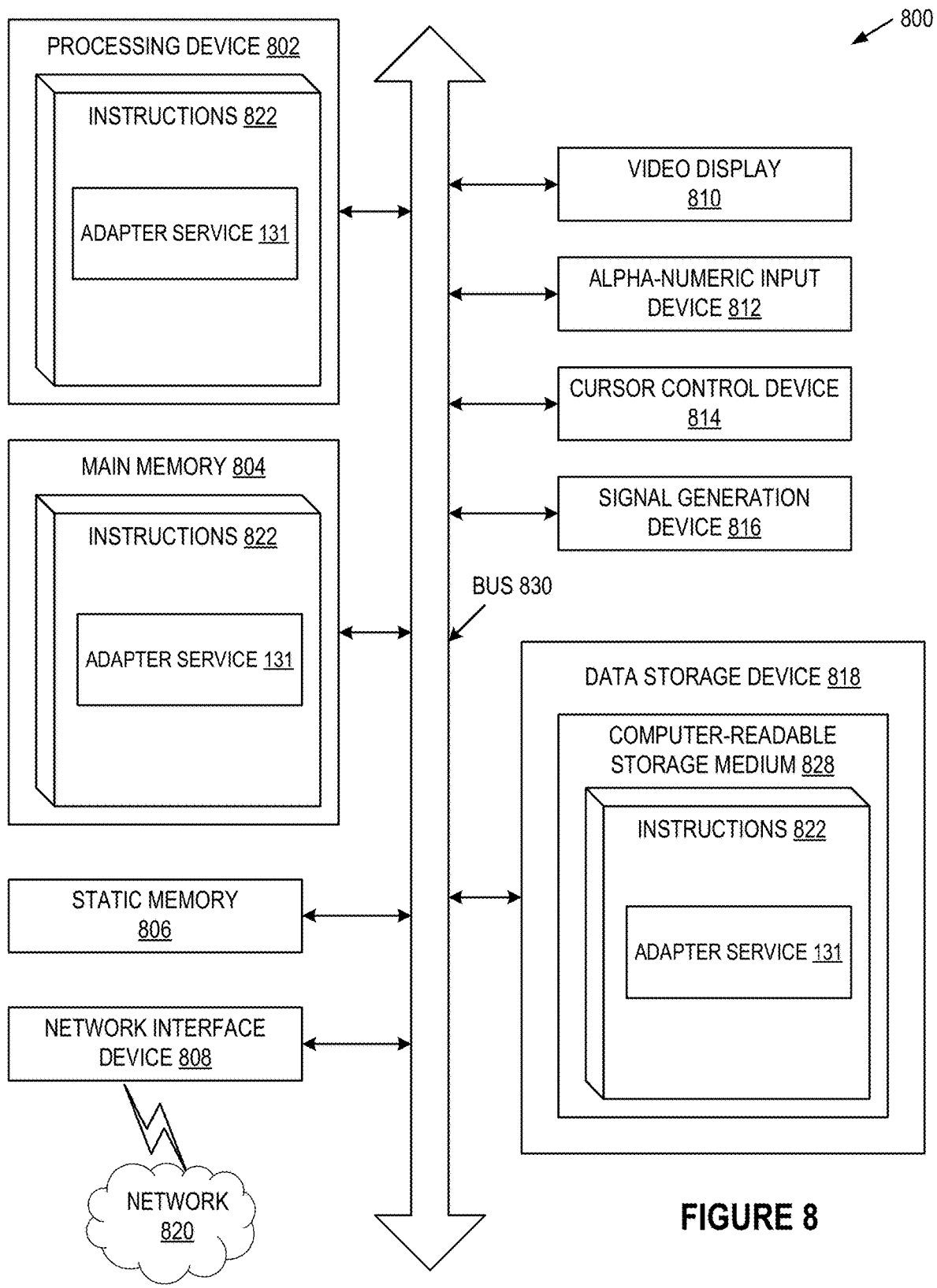
FIG. 8 is a block diagram illustrating an example computing device having installed thereon instructions for an adapter service, in accordance with embodiments of the present disclosure.

FIG. 8 is a block diagram illustrating an example computing device 800 having installed thereon instructions for an adapter service, in accordance with embodiments of the present disclosure. The computing device 800 is a machine within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein. In embodiment, computing device 800 corresponds to server computing device 125 or computing device 135 of FIG. 1.

The example computing device 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory (e.g., a data storage device 818), which communicate with each other via a bus 830.

Processing device 802 represents one or more general-purpose processors such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute the processing logic (instructions 822) for performing the operations discussed herein.

The computing device 800 may further include a network interface device 808. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-readable storage medium (or more specifically a computer-readable storage medium) 828 on which is stored one or more sets of instructions 822 embodying any one or more of the methodologies or functions described herein, such as instructions for adapter service 131. The instructions 822 may also reside, completely or at least partially, within the main memory 804 and/or within the processing device 802 during execution thereof by the computer system 800, the main memory 804 and the processing device 802 also constituting computer-readable storage media.

The computer-readable storage medium 828 may also be used to store an adapter service 131 as discussed herein above, and/or a software library containing methods that call such an adapter service 131. While the computer-readable storage medium 828 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies described herein. The term "computer-readable storage medium" shall accordingly be taken to include, but not be limited to, the non-transitory media including solid-state memories, and optical and magnetic media.

The modules, components and other features described herein can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "determining", "mapping", "generating", "receiving", "resolving", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, or other type of machine-accessible storage media.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
receiving a selection of a device template associated with a physical device, wherein the device template comprises one or more device properties of the physical device;
receiving a selection of a third-party device type associated with a third-party system, wherein the third-party device type comprises one or more additional device properties of the third-party system that correspond to the one or more device properties of the physical device;
determining, by a processing device, a device rule template associated with the third-party device type, the device rule template comprising a first mapping between one or more commands and the one or more additional device properties;
determining, by the processing device, a second mapping between the one or more additional device properties and the one or more device properties; and
generating, by the processing device, an adapter template comprising the first mapping between the one or more commands and the one or more additional device properties and the second mapping between the one or more additional device properties and the one or more device properties.

2. The method of claim 1, wherein the device template and the third-party device type each have a base device type property comprising a same first base device type value, the method further comprising:
determining one or more third-party device types associated with the third-party system that a) have the first base device type value and b) comprise the one or more additional device properties that correspond to the one or more device properties of the physical device; and
generating a list of the one or more third-party device types.

3. The method of claim 1, wherein the third-party system is a third-party voice control system that receives voice inputs and determines commands from the voice inputs, and wherein each property of the one or more additional device properties of the third-party system is associated with one or more commands and comprises a property type and one or more property values that map to the one or more commands.

4. The method of claim 1, wherein the adapter template is a three level object that encapsulates behavior of the physical device under control of the third-party system as a state machine, wherein the three level object comprises a template level represented by a first table, a command level represented by a second table comprising a first plurality of rules associated with the third-party system and a property level represented by a third table comprising a second plurality of rules associated with an additional system that interfaces with the physical device.

5. The method of claim 1, further comprising:
receiving a command from the third-party system;
determining a current state of the physical device;
determining the adapter template associated with the physical device;
determining an action to perform on a first additional device property associated with the third-party device type based on the command and the current state of the physical device, wherein the action comprises modification of the first additional device property to a first property value;
generating a new command for the physical device based on the determined action and the adapter template, wherein the new command comprises an instruction to modify a first device property of the one or more device properties that is mapped to the first additional device property to a second property value; and
sending the new command to the physical device to cause the physical device to modify the first device property to the second property value.

6. The method of claim 1, wherein the adapter template defines the physical device under control in terms of state machine elements, the state machine elements comprising a plurality of states, one or more rules that specify allowable transitions between the plurality of states, and one or more actions that cause the physical device to transition between the plurality of states.

7. The method of claim 1, wherein the device template describes the physical device using the one or more device properties, and wherein the device rule template describes the one or more additional device properties in terms of their relation to voice commands.

8. The method of claim 1, wherein the device rule template comprises allowable property values for each of the one or more additional device properties, the method further comprising:
receiving a configuration setting comprising allowable property values for at least one of the one or more device properties;
wherein determining the second mapping between the one or more additional device properties and the one or more device properties comprises determining mappings between the allowable property values for each of the one or more additional device properties and the allowable property values for the one or more device properties.

9. The method of claim 1, wherein the physical device has a first manufacturer and is controllable using a first service of the first manufacturer, the method further comprising:
receiving a selection of a second device template associated with a second physical device having a second manufacturer, wherein the second physical device is controllable using a second service of the second manufacturer, and wherein the second device template comprises a plurality of device properties of the second physical device;
receiving a selection of a second third-party device type associated with the third-party system, wherein the second third-party device type comprises a plurality of additional device properties of the third-party system that correspond to the plurality of device properties of the physical device;
determining a second device rule template associated with the second third-party device type, the second device rule template comprising a third mapping between a plurality of commands and the plurality of device properties;

determining a fourth mapping between the plurality of additional device properties and the plurality of device properties; and generating a second adapter template comprising the plurality of device properties, the plurality of additional device properties, the first mapping between the plurality of commands and the plurality of additional device properties and the second mapping between the plurality of additional device properties and the plurality of device properties.

10. A system comprising:
a memory; and
a processing device operatively coupled to the memory, the processing device to:
receive a selection of a device template associated with a physical device, wherein the device template comprises one or more device properties of the physical device;
receive a selection of a third-party device type associated with a third-party system, wherein the third-party device type comprises one or more additional device properties of the third-party system that correspond to the one or more device properties of the physical device;
determine a device rule template associated with the third-party device type, the device rule template comprising a first mapping between one or more commands and the one or more additional device properties;
determine a second mapping between the one or more additional device properties and the one or more device properties; and
generate an adapter template comprising the one or more device properties, the one or more additional device properties, the first mapping between the one or more commands and the one or more additional device properties and the second mapping between the one or more additional device properties and the one or more device properties.

11. The system of claim 10, wherein the device template and the third-party device type each have a base device type property comprising a same first base device type value, wherein the processing device is further to:
determine one or more third-party device types associated with the third-party system that a) have the first base device type value and b) comprise the one or more additional device properties that correspond to the one or more device properties of the physical device; and
generate a list of the one or more third-party device types.

12. The system of claim 10, wherein the third-party system is a third-party voice control system that receives voice inputs and determines commands from the voice inputs, and wherein each property of the one or more additional device properties of the third-party system is associated with one or more commands and comprises a property type and one or more property values that map to the one or more commands.

13. The system of claim 10, wherein the adapter template is a three level object that encapsulates behavior of the physical device under control of the third-party system as a state machine, wherein the three level object comprises a template level represented by a first table, a command level represented by a second table comprising a first plurality of rules associated with the third-party system and a property level represented by a third table comprising a second plurality of rules associated with an additional system that interfaces with the physical device.

14. The system of claim 10, wherein the processing device is further to:
receive a command from the third-party system;
determine a current state of the physical device;
determine the adapter template associated with the physical device;
determine an action to perform on a first additional device property associated with the third-party device type based on the command and the current state of the physical device, wherein the action comprises modification of the first additional device property to a first property value;
generate a new command for the physical device based on the determined action and the adapter template, wherein the new command comprises an instruction to modify a first device property of the one or more device properties that is mapped to the first additional device property to a second property value; and
send the new command to an additional service for transmission to the physical device, wherein the new command is to cause the physical device to modify the first device property to the second property value.

15. The system of claim 10, wherein the adapter template defines the physical device under control in terms of state machine elements, the state machine elements comprising a plurality of states, one or more rules that specify allowable transitions between the plurality of states, and one or more actions that cause the physical device to transition between the plurality of states.

16. The system of claim 10, wherein the device template describes the physical device using the one or more device properties, and wherein the device rule template describes the one or more additional device properties in terms of their relation to voice commands.

17. The system of claim 10, wherein the device rule template comprises allowable property values for each of the one or more additional device properties, and wherein the processing device is further to:
receive a configuration setting comprising allowable property values for at least one of the one or more device properties;
wherein determining the second mapping between the one or more additional device properties and the one or more device properties comprises determining mappings between the allowable property values for each of the one or more additional device properties and the allowable property values for the one or more device properties.

18. The system of claim 10, wherein the physical device has a first manufacturer and is controllable using a first service of the first manufacturer, and wherein the processing device is further to:
receive a selection of a second device template associated with a second physical device having a second manufacturer, wherein the second physical device is controllable using a second service of the second manufacturer, and wherein the second device template comprises a plurality of device properties of the second physical device;
receive a selection of a second third-party device type associated with the third-party system, wherein the second third-party device type comprises a plurality of additional device properties of the third-party system that correspond to the plurality of device properties of the physical device;
determine a second device rule template associated with the second third-party device type, the second device rule template comprising a third mapping between a plurality of commands and the plurality of device properties;

determine a fourth mapping between the plurality of additional device properties and the plurality of device properties; and generate a second adapter template comprising the plurality of device properties, the plurality of additional device properties, the first mapping between the plurality of commands and the plurality of additional device properties and the second mapping between the plurality of additional device properties and the plurality of device properties.

19. A non-transitory computer readable medium comprising instructions that, when executed by a processing device, cause the processing device to perform operations comprising:

receiving a selection of a device template associated with a physical device, wherein the device template comprises one or more device properties of the physical device;

receiving a selection of a third-party device type associated with a third-party system, wherein the third-party device type comprises one or more additional device properties of the third-party system that correspond to the one or more device properties of the physical device;

determining, by the processing device, a device rule template associated with the third-party device type, the device rule template comprising a first mapping between one or more commands and the one or more additional device properties;

determining, by the processing device, a second mapping between the one or more additional device properties and the one or more device properties; and generating, by the processing device, an adapter template comprising the one or more device properties, the one or more additional device properties, the first mapping between the one or more commands and the one or more additional device properties and the second mapping between the one or more additional device properties and the one or more device properties.

20. The non-transitory computer readable medium of claim 19, the operations further comprising:

receiving a command from the third-party system;

determining a current state of the physical device;

determining the adapter template associated with the physical device;

determining an action to perform on a first additional device property associated with the third-party device type based on the command and the current state of the physical device, wherein the action comprises modification of the first additional device property to a first property value;

generating a new command for the physical device based on the determined action and the adapter template, wherein the new command comprises an instruction to modify a first device property of the one or more device properties that is mapped to the first additional device property to a second property value; and sending the new command to the physical device to cause the physical device to modify the first device property to the second property value.

* * * * *